(12) United States Patent
Smith et al.

(10) Patent No.: US 6,245,461 B1
(45) Date of Patent: Jun. 12, 2001

(54) BATTERY PACKAGE HAVING CUBICAL FORM

(75) Inventors: David R. Smith; Arthur J. Szafarak, both of Clarkston, MI (US)

(73) Assignee: DaimlerChrysler, Auburn Hills, MI (US)

( * ) Notice: Subject to any disclaimer, the term of this patent is extended or adjusted under 35 U.S.C. 154(b) by 0 days.

(21) Appl. No.: 09/317,769

(22) Filed: May 24, 1999

(51) Int. Cl.[7] ................................................ H01M 4/58
(52) U.S. Cl. ........................... 429/231.8; 429/231.95; 429/218.1; 429/209; 429/211; 429/127; 429/152; 429/160; 429/162
(58) Field of Search .................... 429/231.8, 231.95, 429/209, 218.1, 127, 211, 152, 160, 162, 176, 177

(56) References Cited

U.S. PATENT DOCUMENTS 4,865,931 * 9/1989 McCullough, Jr. et al. ........ 429/194
5,525,441 * 6/1996 Reddy et al. ........................ 429/127

* cited by examiner

*Primary Examiner*—Carol Chaney
*Assistant Examiner*—Angela J. Martin
(74) *Attorney, Agent, or Firm*—William J. Coughlin

(57) ABSTRACT

A lithium ambient graphite fiber battery includes a battery inner case in which there are provided a series of adjacent cells. Within each of the cells is provided a cubical electrode bundle. The bundle is composed of a pair of flat, elongated carbon fiber electrodes. The electrodes may be of a triaxial or biaxial braid or may be of a unidirectional arrangement. The pair of electrodes is folded, one fold upon the other, to form the general shape of a cube. The cubical electrode bundles are placed adjacent one another in the cells defined within the inner battery case. A cell-to-cell interconnect is made by electrode extensions which carries the electrode over from one cell to the next in semi-bipolar form. Given the known susceptibility of lithium batteries to water, the inner battery case is hermetically sealed within an outer battery case. A pair of terminals are provided.

20 Claims, 5 Drawing Sheets

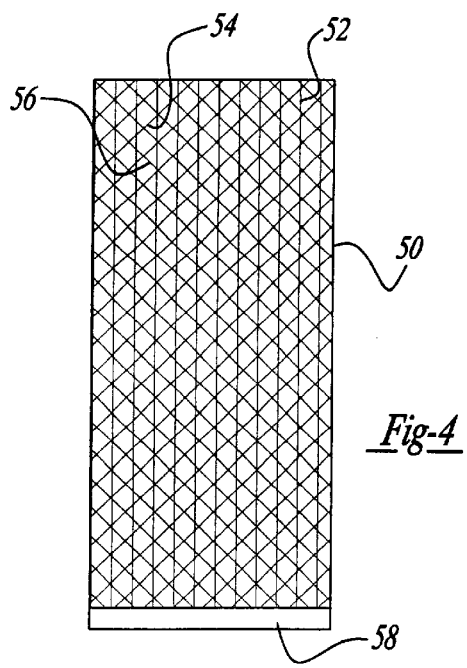
_Fig-4_
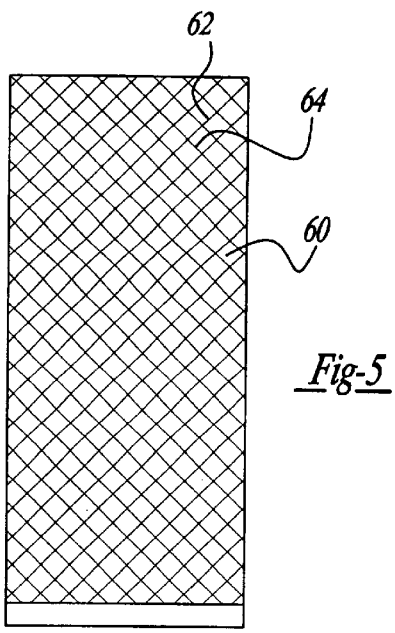
_Fig-5_
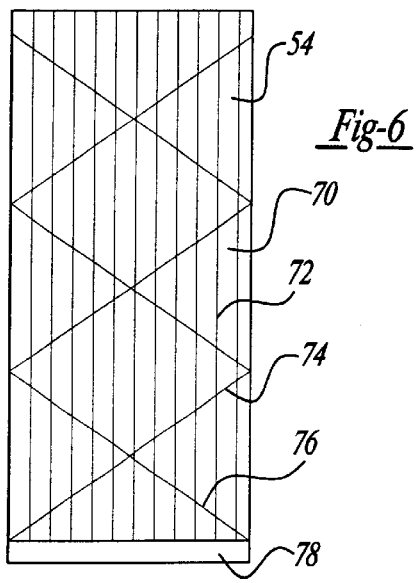
_Fig-6_
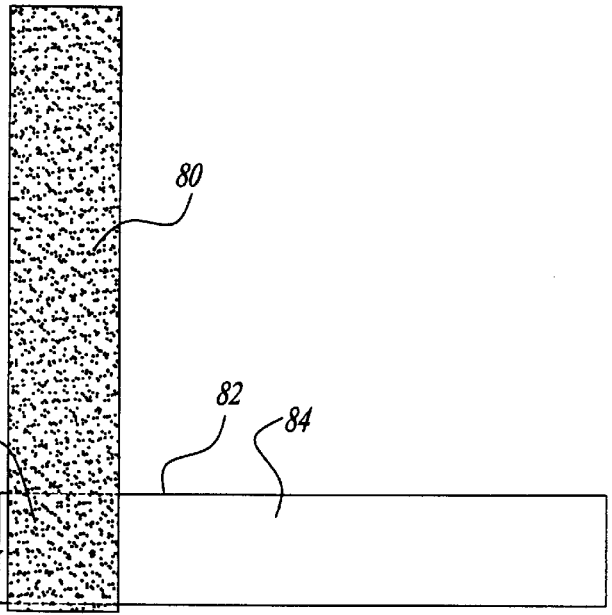
_Fig-7_

BATTERY PACKAGE HAVING CUBICAL FORM

BACKGROUND OF THE INVENTION

1. Technical Field

The present invention relates generally to a lithium ambient graphite fiber battery (LiAGF). More particularly, the present invention relates to a battery packaging arrangement in which plural folded cubical electrode bundles composed of braided graphite fiber electrodes are disposed in a battery box having plural individual cells. The individual cells are formed in a battery case.

2. Summary of Related Art

The dual graphite lithium battery was originally developed in the early 1980's in an effort to provide a lightweight energy source capable of delivering very high energy density. The driving force behind the development of the lithium ion battery has been for some time the need for a lightweight and rechargeable power source embodying a high energy density for use in small electronic devices such as laptop computers and video cameras.

Additional applications of batteries demonstrating high energy density and light weight are being considered and explored. Specifically, electric vehicle applications are thought to be a promising use of this type of power source.

Electric vehicles, of course, are not new. Electric cars were introduced in the early 20th century which utilized aqueous-electrolyte type lead batteries. Lead batteries were satisfactory then (and remain satisfactory today) with respect to their good rechargeability. Because of the poor weight-to-energy-density ratio of the lead battery, these early electric vehicles proved slow and incapable of long distance operation.

Electric vehicles have traditionally been anachronistic, and, while offering the same modem appearance as their counterparts, have continued to suffer from the lead battery's excessive weight and low energy density.

These problems have forced a shift in research to the lithium battery. Given the demand for a rechargeable secondary battery having an attractive energy density-to-weight ratio, much energy has been expended in studying various types of cells. Rechargeable lithium cells of many varieties have generated much interest. But the results have not been entirely promising. For example, rechargeable, nonaqueous electrolyte cells using lithium metal negative electrodes have presented several problems. Such batteries demonstrate poor fast charging properties and are notorious for their short cycle life. Great concern also exists for the inherent safety of the lithium battery largely the result of the irregular plating of lithium metal as the battery is cycled.

To overcome these problems while providing a power source that has application in electric vehicle technology, rechargeable batteries based on lithium intercalation are being researched. The lithium ion-based secondary cell is a nonaqueous secondary cell. Typically, lithium or a lithium salt is provided as an ion source which is intercalated into a carbon electrode to create a positively charged electrode.

Lithium ion batteries provide several advantages over known lead batteries, such as small self-discharge characteristics and, at least when compared to lead batteries, environmental safety. But the greatest advantage of lithium ion batteries over the known lead battery for vehicle application is attractive energy-density-to-weight ratio. Being lightweight while offering high energy density, the lithium ion battery is thought to have great potential in electric vehicle applications.

The cathode in a conventional lithium ion battery (typically a metal oxide such as $Mn_2O_4$, $CoO_2$, or $NiO$) is doped with lithium. The conventional lithium ion battery uses a lithium salt (typically $LiPF_6$ or $LiClO_4$) dissolved in one or more organic solvents. When dissolved, the salt in the electrolyte is split into the positive ion and negative cation (depending on the salt used). The lithium ambient graphite fiber battery positive ion is intercalated into the carbon anode and the negative ion is intercalated into the carbon cathode.

When a charge is applied to the positive and negative electrodes, the lithium from the cathode is transported from the cathode as an ion and is intercalated into the anode (carbon or lithium metal). Voltage is created by the difference in potential of the positively charged anode and the negatively charged cathode.

On discharge, the process is reversed and lithium ions flow from the anode into the liquid electrolyte as do the negative ions from the cathode. The cell is balanced by equal parts of positive and negative ions absorbed back into the electrolyte.

Since the lithium ion moves from one electrode to the other to store energy the lithium ion battery is commonly known as a "rocking chair battery." The lithium ambient graphite fiber battery uses the same principal of intercalation for the positive electrode (carbon) and uses it again for the negative electrode (carbon). This is in lieu of a lithium doped metal oxide.

The lithium ambient graphite fiber battery is thought to be more attractive in electric vehicle applications. The lithium ambient graphite fiber battery, for example, is safer in principal than the lithium ion battery. In addition, while demonstrating a comparable theoretical energy density to the lithium ion battery, the lithium ambient graphite fiber battery will demonstrate more recharge cycles than a lithium ion battery.

A number of patents have issued which teach the general construction of the lithium ion battery. Such patents include, for example: U.S. Pat. No. 5,631,106, issued on May 20, 1997, to Dahn et al. for ELECTRODES FOR LITHIUM ION BATTERIES USING POLYSILAZANES CERAMIC WITH LITHIUM; U.S. Pat. No. 5,721,067, issued on Feb. 24, 1998 to Dasgupta et al. for RECHARGEABLE LITHIUM BATTERY HAVING IMPROVED REVERSIBLE CAPACITY; U.S. Pat. No. 5,705,292, issued on Jan. 6, 1998 to Fujiwara et al. for LITHIUM ION SECONDARY BATTERY; U.S. Pat. No. 5,677,083, issued on Oct. 14, 1997, to Tomiyama for NON-AQUEOUS LITHIUM ION SECONDARY BATTERY COMPRISING AT LEAST TWO LAYERS OF LITHIUM-CONTAINING TRANSITIONAL METAL OXIDE; U.S. Pat. No. 5,670,277, issued on Sep. 23, 1997, to Barker et al. for LITHIUM COPPER OXIDE CATHODE FOR LITHIUM CELLS AND BATTERIES; U.S. Pat. No. 5,612,155, issued on Mar. 18, 1997, to Asami et al. for LITHIUM ION SECONDARY BATTERY; U.S. Pat. No. 5,595,839, issued on Jan. 21, 1997, to Hossain for BIPOLAR LITHIUM-ION RECHARGEABLE BATTERY; U.S. Pat. No. 5,587,253, issued on Dec. 24, 1996, to Gozdz et al. for LOW RESISTANCE RECHARGEABLE LITHIUM-ION BATTERY; U.S. Pat. No. 5,571,634, issued on Nov. 5, 1996, to Gozdz et al. for HYBRID LITHIUM-ION BATTERY POLYMER MATRIX COMPOSITIONS; U.S. Pat. No. 5,567,548, issued on Oct. 22, 1996, to Margalit for LITHIUM ION BATTERY WITH LITHIUM VANADIUM PENTOXIDE POSITIVE ELECTRODE; U.S. Pat. No. 5,554,459, issued on Sep. 10, 1996, to Gozdz et al. for MATERIAL AND METHOD FOR LOW INTERNAL RESISTANCE LITHIUM ION BATTERY; U.S. Pat. No. 5,547,782, issued Aug. 20, 1996, to Dasgupta et al. for CURRENT COLLOZION FOR LITHIUM ION BATTERY; U.S. Pat. No. 5,496,663, issued on Mar. 5, 1996, to Margalit et al. for LITHIUM VANADIUM PENTOXIDE POSITIVE ELECTRODE; and U.S. Pat. No. 5,478,668, issued on Dec. 26, 1995, to Gozdz et al. for RECHARGEABLE LITHIUM BATTERY CONSTRUCTION.

Also among this group are several patents to McCullough, McCullough et al., or McCullough, Jr. et al. which include: U.S. Pat. No. 4,631,118, issued on Dec. 23, 1986, for LOW RESISTANCE COLLECTOR FRAME FOR ELECTRODONDUCTIVE ORGANIC, CARBON AND GRAPHITIC MATERIALS; U.S. Pat. No. 4,830,938, issued on May 16, 1989, for SECONDARY BATTERY; U.S. Pat. No. 5,503,929, issued Apr. 2, 1996, for LINEAR CARBONACEOUS FIBER WITH IMPROVED ELONGABILITY; U.S. Pat. No. 5,532,083, issued on Jul. 2, 1996, for FLEXIBLE CARBON FIBER ELECTRODE WITH LOW MODULUS AND HIGH ELECTRICAL CONDUCTIVITY, BATTERY EMPLOYING THE CARBON FIBER ELECTRODE, AND METHOD OF MANUFACTURE; and U.S. Pat. No. 5,518,836, issued May 21, 1996, for FLEXIBLE CARBON FIBER, CARBON FIBER ELECTRODE AND SECONDARY ENERGY STORAGE DEVICES.

While representing improvements in the art of the lithium battery, known technology still fails to provide a flexible lithium battery system within which maximum electrode surface area may be achieved in a minimum amount of space.

SUMMARY OF THE INVENTION

The present invention provides a flexible system by which a high voltage, high energy lithium ambient graphite fiber battery may be built.

Accordingly, it is an object of the present invention to provide such a battery in which a single cell embodies a cubical shape so as to provide a maximum amount of surface area to the electrolyte in the most compact form.

Another object of the present invention is to provide such a battery in which each cell comprises a pair of electrodes folded over one another in a continuous pattern to form a cubical electrode bundle.

A further object of the present invention is to provide such a battery in which each of the electrodes is formed according to a triaxial, biaxial, or unidirectional carbon fiber configuration.

An additional object of the present invention is to provide such a battery in which a plural number of cells are provided as needed.

Still a further object of the present invention is to provide such a battery in which the cells are defined in a multi-celled inner case.

Yet a further object of the present invention is to provide such a battery in which the multi-celled inner case is hermetically sealed within an outer case.

These and other objects are achieved by the present lithium ambient graphite fiber battery. According to the present invention, a battery inner case is provided which defines a series of adjacent cells. Within each of the cells is provided a cubical electrode bundle. The bundle is composed of a pair of flat, elongated carbon fiber electrodes. The electrodes may be of a triaxial or biaxial braid or may be of a unidirectional arrangement. The pair of electrodes is folded, one fold upon the other, to form the general shape of a cube. The cubical electrode bundles are placed adjacent one another in the cells defined within the inner battery case. A cell-to-cell interconnect is made by electrode extensions which carries the electrode over from one cell to the next in semi-bipolar form. Given the known susceptibility of lithium batteries to water, the inner battery case is hermetically sealed within an outer battery case. A pair of terminals are provided.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 4 is a plan view of a portion of a triaxial braided electrode according to a first embodiment of the electrode braid pattern of the present invention;

FIG. 5 is a plan view of a portion of a biaxial braided electrode according to a second embodiment of the electrode braid pattern of the present invention;

FIG. 6 is a plan view of a portion of a unidirectional braided electrode according to a third embodiment of the electrode braid pattern of the present invention;

FIG. 7 is a plan view of an upper electrode and a lower electrode aligned with respect to one another as the first step of the folding process for building a single cubical electrode bundle according to the present invention;

DETAILED DESCRIPTION OF THE PREFERRED EMBODIMENTS

The drawings disclose the preferred embodiments of the present invention. While the configurations according to the illustrated embodiment are preferred, it is envisioned that alternate configurations of the present invention may be adopted without deviating from the invention as portrayed. The preferred embodiments are discussed hereafter.

Figure 1:
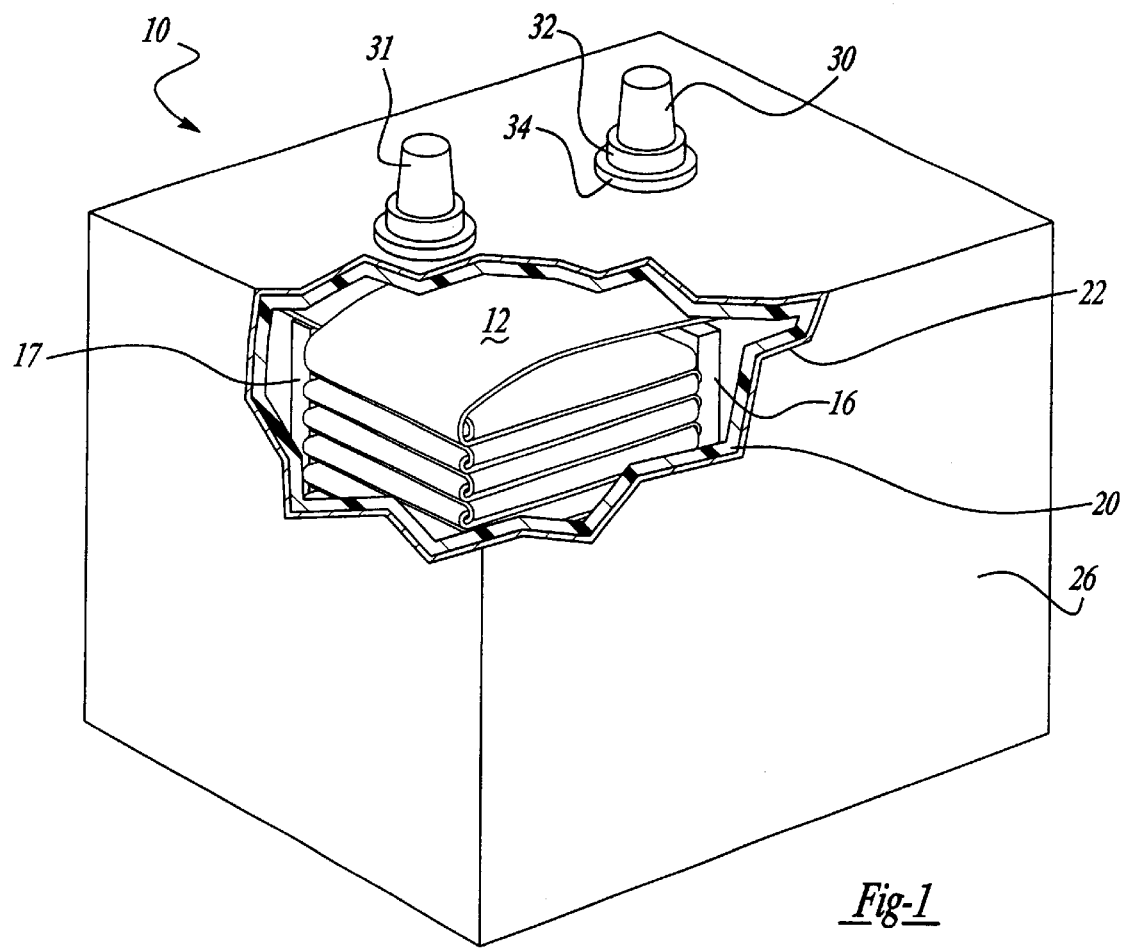
FIG. 1 is a perspective view of our exemplary battery package in accordance with the present invention in which a portion of the battery casing has been broken away to thereby reveal adjacent cells within which folded cubical electrode bundles are arranged.
Figure 3:
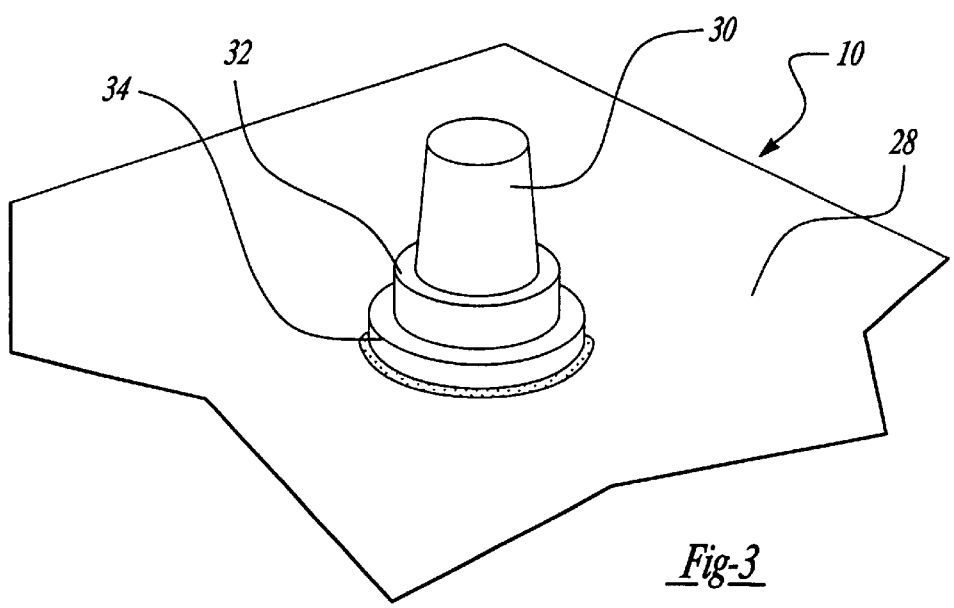
FIG. 3 is a perspective close-up view of a single terminal of the battery of the present invention.
Figure 2:
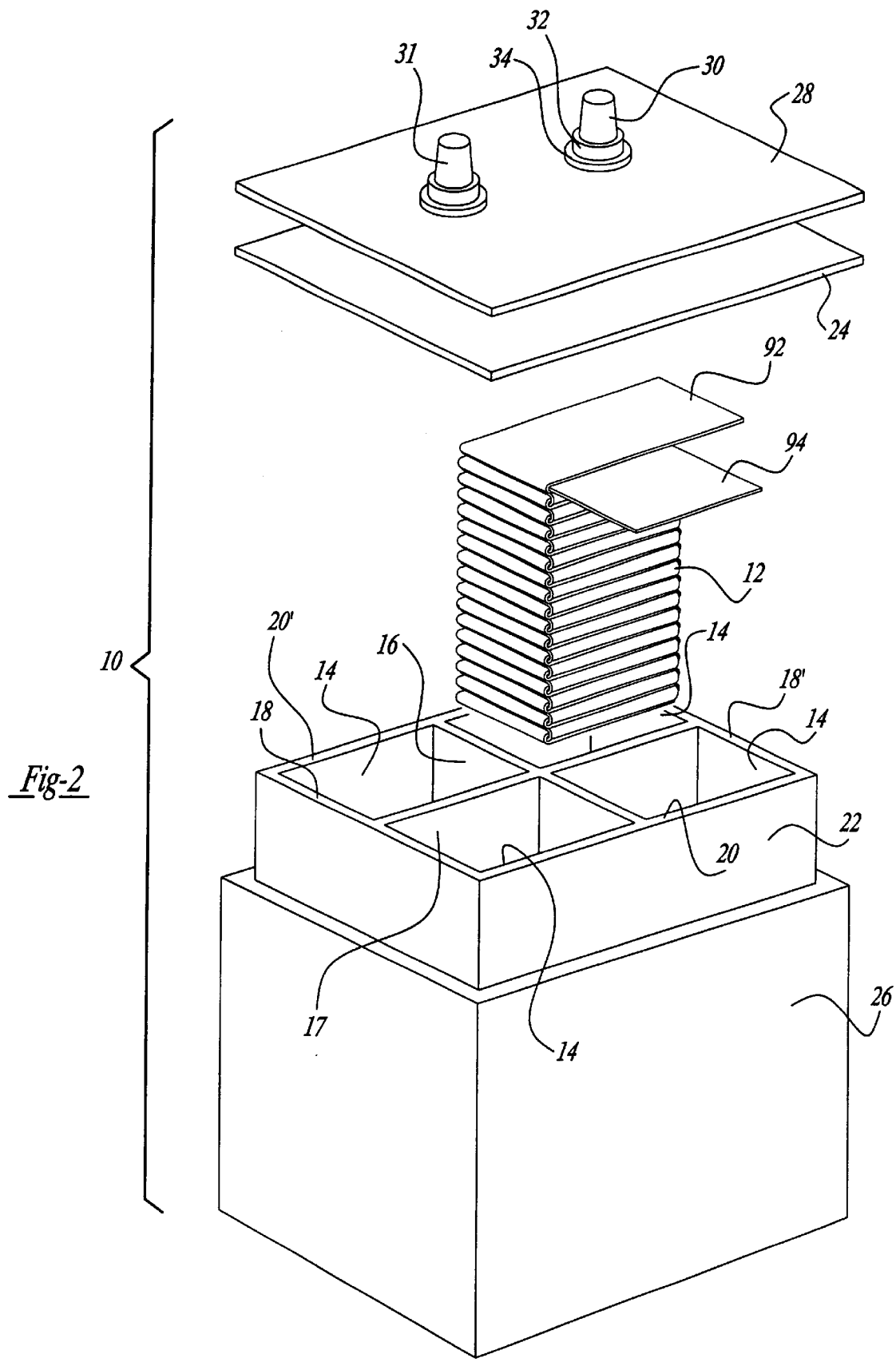
FIG. 2 is an exploded view of the battery package of FIG. 1 illustrating the outer battery case, the inner battery case divided into a plurality of individual cells, an exemplary folded cubical electrode bundle, the inner battery case lid, and the outer battery case lid.

In general, FIGS. 1 through 3 relate to the overall construction of a lithium ambient graphite fiber battery according to the present invention. The illustrated configuration as presented is for illustrative purposes only and should not be limiting. For example, the battery, generally illustrated as 10, is shown as having a generally box shape, a design which is conventional for many batteries, particularly automobile batteries. The shape, however, could be otherwise For example, and with particular reference to FIGS. 1 and 2, the battery 10 includes a plurality of folded cubical electrode bundles, of which only one bundle 12 is illustrated. Accordingly, and to the extent that the bundles 12 are in cubical form, the variety of shapes of the battery 10 will only likely be limited by the cubical shape of the electrode bundles 12.

The battery 10 as illustrated in FIG. 1 is partially cut away to reveal a portion of the electrode bundle 12, the rest of which is concealed with the battery. According to the embodiment disclosed herein, an arrangement of four electrode bundles 12 is provided, this arrangement being illustrated in FIG. 2 in which only a single bundle is shown for purposes of demonstration. Each of the electrode bundles 12 produces approximately 4 volts, creating a total output of 16 volts for the battery 10. It is understood that a greater or lesser number of electrode bundles 12 would consequently produce a greater or lesser voltage output. The four cell, 16 volt construction is set forth for demonstrative purposes.

Each of the bundles 12 is fitted within an individual cell 14. The cells 14 are defined by a pair of intersecting internal walls 16, 17, a pair of opposing end walls 18, 18', and a pair of opposing side walls 20, 20'. The internal walls 16, 17, the pair of opposing end walls 18, 18', the pair of opposing side walls 20, 20', and the base wall (not shown) define an inner case 22. The inner case 22 provides isolation between the electrode bundles 12 fitted within the cells 14. Isolation results from the fluid-tight construction of each of the cells 14 which, in addition to their walls, is provided by an integrally-formed inner case floor (not shown) and an inner lid 24, to be discussed below.

While a variety of non-conductive, energy-neutral materials may be used to form the inner case 22, an injection-moldable polymerizable material is preferred, such as polypropylene, polyethylene or hard rubber. The material is selected based on qualities of impact and fluid resistance as well as cost-effectiveness. The space defined by the individual cells 14 may be fully sealed by attachment of the inner lid 24 over which is attached the open end of each cell by a sealing process such as hot melting through the use of a hot plate.

The preferred electrolyte for use in the battery 10 consists of an organic liquid which includes propylene carbonate, ethylene carbonate, dimethyl carbonate or sulfonate and a lithium salt ($LiClO_4$, $LiBF_4$, $LiPF_6$). The salt can be dissolved in concentrations between 15–40%. (Concentrations toward 15% demonstrate higher power density, while concentrations toward 40% demonstrate higher energy density.) Complete sealing of the individual cells 14 is important because water infiltration into the battery case is the life limiting factor in the lithium ambient graphite fiber battery. (The problems associated with excessive water in the lithium battery are at least two-fold. First, the presence of water results in voltage instability. Second, and probably more importantly, the presence of water in the electrolyte solution forms inert LiOH.) Given this consideration, water barriers become an important element of the design of any LiAGF battery.

The barrier may be integral with or formed separate from the battery case, but in any event must be capable of limiting or eliminating the intrusion of moisture into the cells 14. To this end, the battery 10 may be provided with a moisture-proof, hermetically sealed outer case 26 and outer lid 28. The outer case 26 may be composed of a variety of materials, although a metal or a metallized coating is preferred. As an alternative, a bag composed of a polymerized material with a foil metal layer may be used (not shown).

The battery 10 is fitted with terminals for attachment to the powered electrical device or to a charging source. A pair of such terminals—a negative terminal 30 and a positive terminal 31—are illustrated in FIGS. 1 and 3. With specific reference to FIG. 3, the arrangement of one of the terminals 30, 31 is illustrated disposed on the battery 10. The negative terminal 30 will be discussed for demonstrative purposes, but it is to be understood that a description of the positive terminal would be the same.

The terminal is composed of a conductive metal material as is known in the art. While a conventional shape for the terminal 30 is illustrated, it should be understood that other shapes including, for example, a flat surface having a threaded hole formed therein for receiving a bolt (not shown) may be adopted.

Because the illustrated battery 10 employs a metal outer case 26, it is necessary to prevent conduction between the terminal 30 and the case 26. An insulator 32 is fitted to the outer peripheral edge of the terminal 30 to isolate the terminal 30 from the outer case 26. The insulator 32 may be made from a variety of non-conductive materials, but is preferably made from glass or ceramic. The insulator 32 is fitted to a metal anchoring ring 34 which is itself attached to the outer case 26 by welding.

FIGS. 4 through 11 illustrate the construction of an individual electrode bundle 12 in its various stages of assembly. In generally, each electrode bundle 12 is composed of a pair of folded electrodes separated by a non-conductive barrier, each electrode being composed of carbon fibers.

FIGS. 4, 5 and 6 illustrate the types of carbon fiber electrodes that may be employed in the battery 10 of the present invention. The illustrated electrodes are intended to be illustrative and not limiting. Regardless of the embodiment, the electrode must embody a form in which all of the individual fibers are continuous and are electrically connected in a positive manner. In this circumstance, there are two basic ways in which the carbon fibers may be linked. One method of linking the braids is through braiding. The other method of linking is through a unidirectional arrangement. Both will be discussed with respect to FIGS. 4 through 6 set out below. (Weaving of the individual carbon fibers is also a design possibility. However, woven fibers have not performed well because the fiber woven on the 90° bias is not continuous to the fibers travelling the length of the cloth.)

The braiding arrangement offers certain advantages unavailable in the unidirectional arrangement and vice versa. For example, a braided electrode has the advantage of being able to incorporate a more graphitized (and hence, more brittle) carbon fiber than a unidirectional format. Conversely, the unidirectional electrode—which has the majority of its fibers traveling in the direction of the 0° axis with as little as one percent in cross braid as illustrated below with respect to FIG. 6—is less difficult and costly to manufacture.

FIGS. 4 and 5 illustrate preferred examples of the braided forms of the electrode of the present invention. Specifically, FIG. 4 illustrates a triaxial embodiment 50 of the braided electrode. The triaxial embodiment 50 includes sets of fibers in three directions. A first set of fibers 52 run along the 0° axis of the triaxial embodiment 50, while a second set of fibers 54 run along approximately the 135° axis of the triaxial embodiment 50, and a third set of fibers 56 run along approximately the 45° axis of the triaxial embodiment 50. An electrical contact 58 is provided along at least one terminal end of the triaxial embodiment 50 and is formed from a conductive material such as copper or a silver paint. The triaxial embodiment 50 may be constructed in the form of either a braided tube (which is flattened for use) or a flat tape.

FIG. 5 illustrates a biaxial embodiment 60 of the braided electrode for optional use in the present invention. The biaxial embodiment 60 includes fibers in two of the three directions set forth above with respect to the triaxial version 50. Accordingly, a first set of fibers 62 run along approximately the 135° axis of the biaxial embodiment 60 while a second set of fibers 64 run along approximately the 45° axis of the biaxial embodiment 60. An electrical contact 66 is provided along at least one terminal end of the biaxial embodiment 60 and is formed from a conductive material such as copper or a silver paint. The biaxial embodiment 60 may be constructed in the form of a braided tube which is flattened for use.

FIG. 6 illustrates a unidirectional embodiment 70 of the braided electrode for optional use in the present invention. The unidirectional embodiment 70 includes a single set of fibers 72 in one direction along the 0° axis. A first set of cross braids 74 and a second set of cross braids 76 are provided to lend structural support to the fibers 72. The braids 74, 76 do not need to be composed of a carbon material but do need to be compatible with the electrolyte of the battery 10. As little as one percent of the material by weight employed in the unidirectional embodiment 70 may be the cross braids 74, 76. An electrical contact 78 is provided along at least one terminal end of the unidirectional embodiment 70 and is formed from a conductive material such as copper or a silver paint. The unidirectional embodiment 70 may be constructed in the form of a flat tape.

Figure 8:
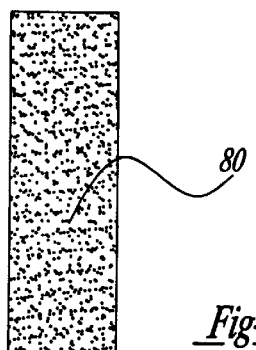
FIG. 8 is a plan view of the pair of electrodes illustrated in FIG. 7 with the lower electrode having been folded over the upper electrode.
Figure 9:
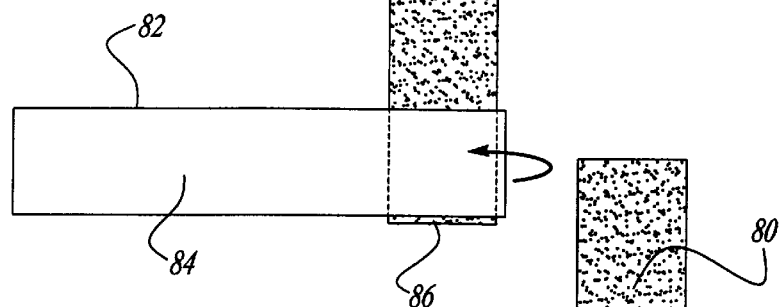
FIG. 9 is a plan view of the pair of electrodes of FIGS. 7 and 8 with the upper electrode having been folded over the lower electrode.

FIGS. 7, 8 and 9 illustrate a preferred method of forming one of the cubical electrode bundles 12 of the present invention. As noted above, each of the bundles 12 is composed of a pair of electrodes, illustrated in FIGS. 7, 8 and 9 as upper electrode 80 and lower electrode 82. (The "upper" and "lower" designations are made for illustrative purposes only.) A non-conductive separator tape 84 is positioned on one or both of the electrodes 80, 82. The non-conductive separator tape 84 may be formed from a variety of nonconductive materials such as a plastic. As shown in FIGS. 7, 8 and 9, layers of the non-conductive separator tape 84 are applied to both sides of the lower electrode 82.

Referring first to FIG. 7, one end 86 of the upper electrode 80 is positioned over one end 88 of the lower electrode 82. Then, as shown in FIG. 8, the lower electrode 82 is folded over the one end 86 of the upper electrode 80. Next, as shown in FIG. 9, the upper electrode 80 is folded over the lower electrode 82.

The folding process begun in FIGS. 7, 8, and 9 is continued until the cubical electrode bundle 12 of the present invention is formed. Details of the folds of the cubical electrode bundle 12 are illustrated in FIGS. 10 and 11.

Figure 10:
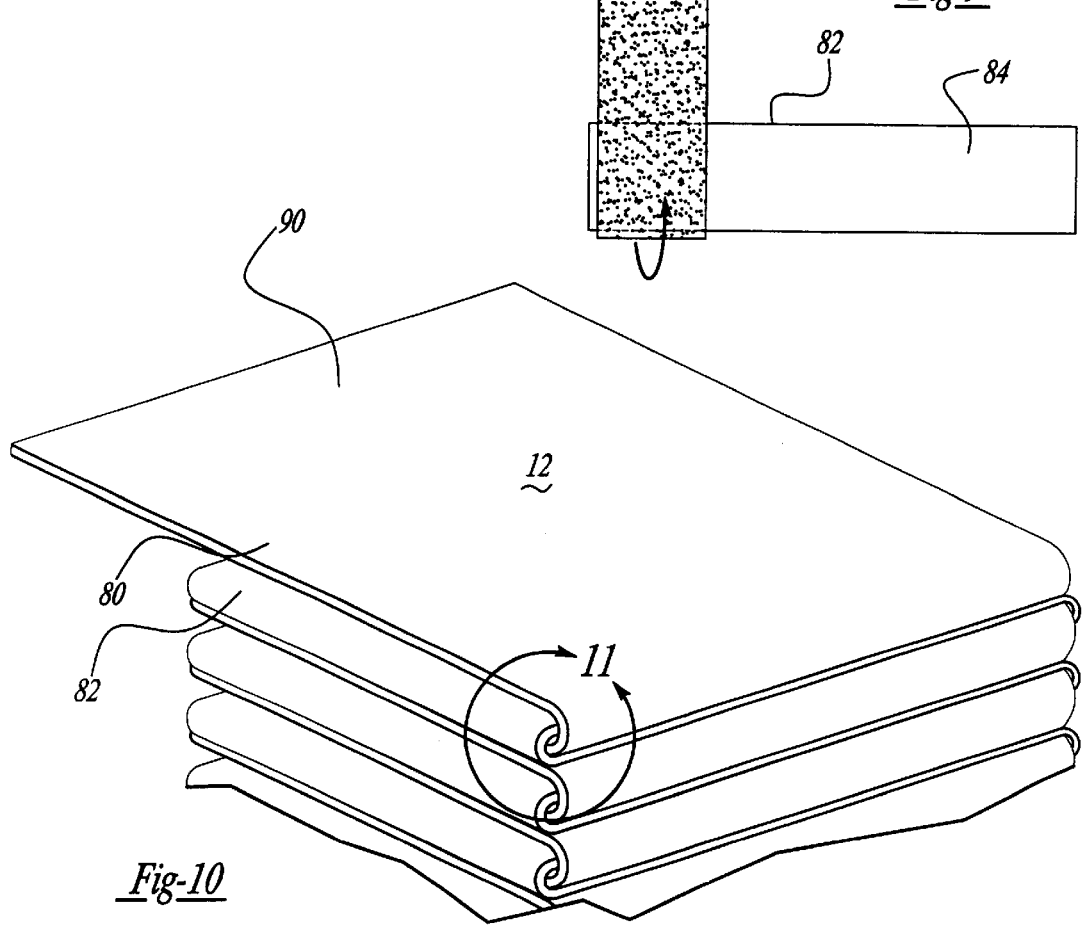
FIG. 10 is a perspective view of a portion of a single cubical electrode bundle constructed according to the folding steps illustrated in part in FIGS. 7 through 9.
Figure 11:
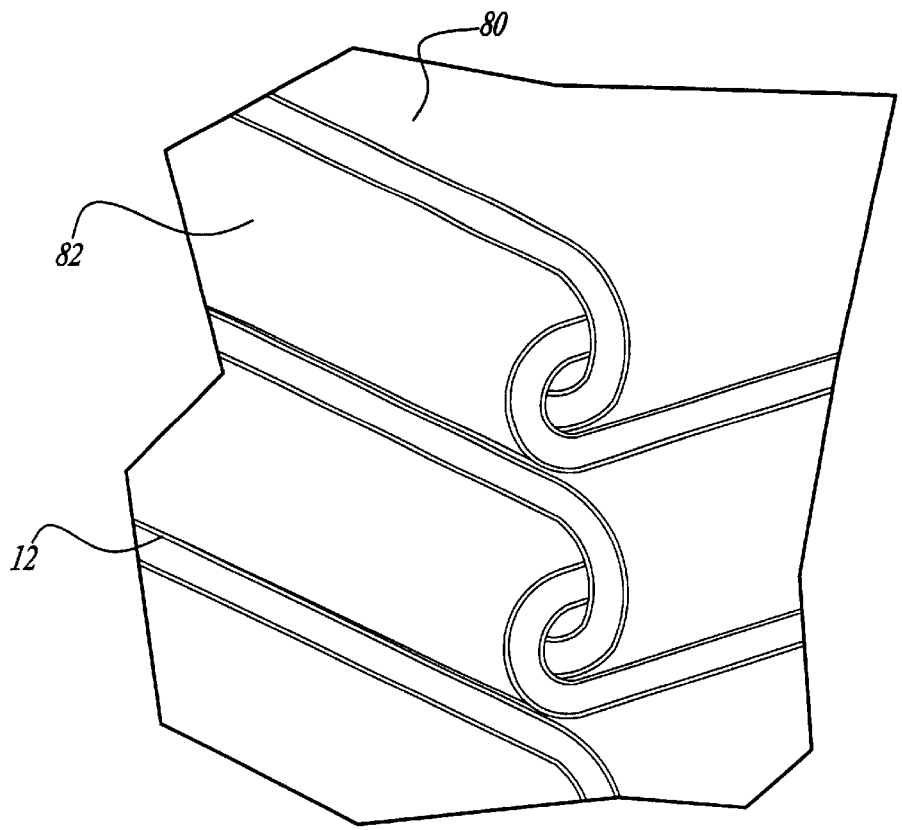
FIG. 11 is a detailed view of the portion of the single cubical electrode bundle illustrated in FIG. 10 and taken along line 11 thereof.

Folding is effected such that a portion 90 of the top-most electrode of the folded cubical electrode bundle 12 extends for a length beyond the bundle 12 as illustrated in FIG. 10. The extended portion 90 functions to carry the electrode over from one cell to the next cell in a semi-bipolar form.

In at least one of the bundles 12 there are two such extensions. Referring back to FIG. 2, the bundle 12 includes an upper electrode extension 92 and a lower electrode extension 94. The upper electrode extension 92 attaches to the terminal 30, while the lower electrode extension extends into the adjacent cell for contact with the uppermost electrode of the adjacent bundle. The arrangement of the adjacent bundles and their overlapping electrodes is set forth in FIG. 12 which illustrates a top plan view of the battery 12 shown without the outer lid 28 and the inner lid 24.

Figure 12:
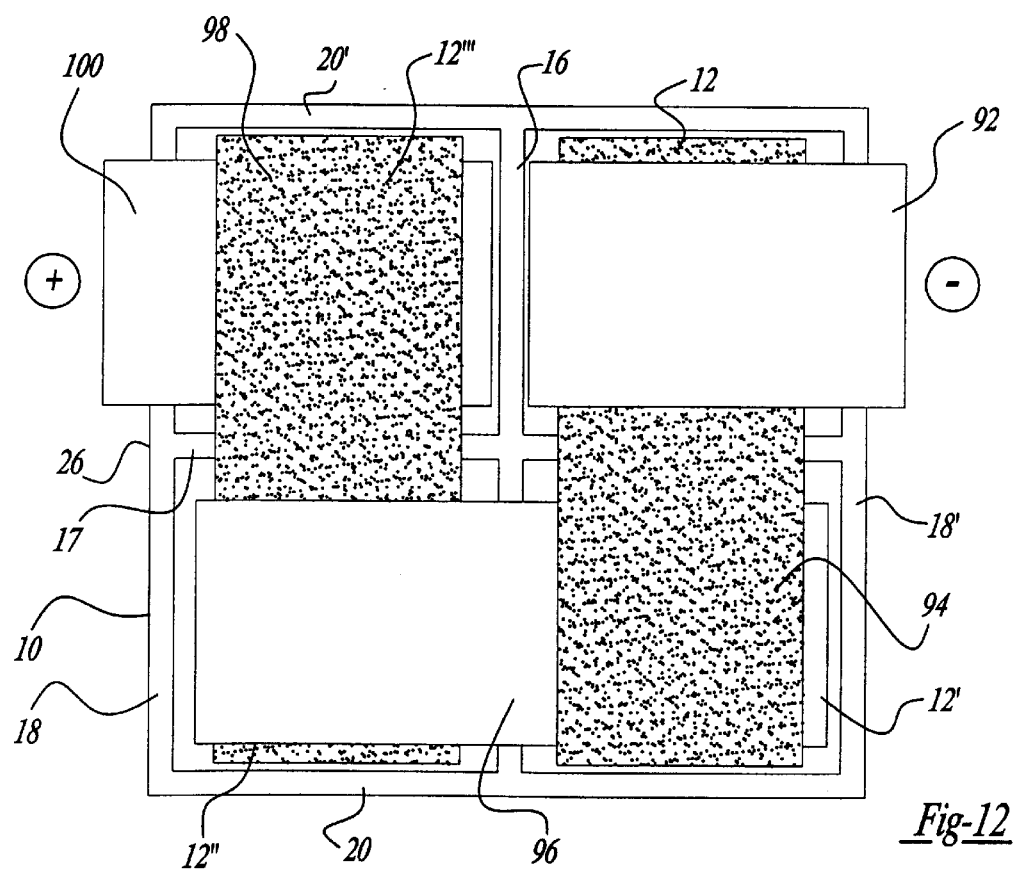
FIG. 12 is a top plan view of four cubical electrode bundles positioned within a multi-celled battery case.

According to the arrangement set forth in FIG. 12, the battery 10 includes four electrode bundles 12, 12', 12", 12'". As set forth above, the electrode bundle 12 includes the upper electrode extension 92 which is attached to the terminal 30 to provide, according to the present embodiment, the negative terminal to the battery 10. The lower electrode extension 94 extends into the adjacent cell to contact the uppermost electrode layer of the electrode bundle 12'. The electrode bundle 12' includes an electrode extension 96 which extends into the next adjacent cell to contact the uppermost electrode layer of the electrode bundle 12". The electrode bundle 12" includes an electrode extension 98 which extends into the next adjacent cell to contact the uppermost electrode layer of the electrode bundle 12'". The electrode bundle 12'" includes an electrode extension 100 which is attached to the positive terminal 31 of the battery 10.

The battery 10 of the present invention provides a system by which a multicelled, high-voltage package can be developed where as many cells as desired may be connected in series to create a high voltage, high-energy, high power battery system.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A lithium ambient graphite fiber battery comprising:
   a battery case having at least two adjacent electrode-receiving cells;
   a cubical electrode bundle provided in each of said at least two adjacent electrode-receiving cells, said bundle being composed of a pair of flat, elongated carbon fiber electrodes each of said electrodes composed of a plurality of continuous carbon fibers defining a pattern, said pattern enabling said electrodes to be folded upon one another to substantially define a cube and a non-conductive separator positioned therebetween.

2. The lithium ambient graphite fiber battery of claim 1, including two cubical electrode bundles, one of said two cubical electrode bundles having an electrode extension connecting with one of the electrodes of the other of said two cubical electrode bundles.

3. The lithium ambient graphite fiber battery of claim 2, further including a pair of terminals electrically connected to said two cubical bundles.

4. The lithium ambient graphite fiber battery of claim 3, wherein each of said two cubical electrode bundles includes an electrode extension connecting one of said pair of terminals to one of said two cubical bundles.

5. The lithium ambient graphite fiber battery of claim 1, wherein each of said flat, elongated carbon fiber electrodes is composed of said plurality of carbon fibers which define a pattern, said pattern being a triaxial braid.

6. The lithium ambient graphite fiber battery of claim 1, wherein each of said flat, elongated carbon fiber electrodes is composed of said plurality of carbon fibers which define said pattern, said pattern being a biaxial braid.

7. The lithium ambient graphite fiber battery of claim 1, wherein each of said flat, elongated carbon fiber electrodes is composed of a plurality of carbon fibers which define a pattern, said pattern being unidirectional.

8. The lithium ambient graphite fiber battery of claim 1, wherein said battery case includes an inner case.

9. The lithium ambient graphite fiber battery of claim 8, wherein said at least two adjacent electrode-receiving cells are defined in said inner case and wherein said inner case includes an inner lid.

10. The lithium ambient graphite fiber battery of claim 1, wherein said battery case includes an outer case.

11. The lithium ambient graphite fiber battery of claim 10, wherein said outer case is composed of a metal.

12. The lithium ambient graphite fiber battery of claim 11, wherein said battery case has a pair of electrical terminals formed thereon, said terminals being isolated from said metal by a non-conductive material.

13. An electrode bundle for use in a lithium ambient graphite fiber battery, the electrode comprising:

a pair of flat, elongated carbon fiber electrodes folded upon one another; and a non-conductive material positioned between said pair of electrodes wherein said carbon fiber electrodes are formed from a continuous fiber defining a foldable pattern.

14. The electrode bundle for use in a lithium ambient graphite fiber battery of claim 1, said electrode bundle defining a shape, said shape being substantially cubical.

15. The electrode bundle for use in a lithium ambient graphite fiber battery of claim 14, wherein each of said flat, elongated carbon fiber electrodes is composed of a plurality of carbon fibers which define said pattern, said pattern being a triaxial braid.

16. The electrode bundle for use in a lithium ambient graphite fiber battery of claim 14, wherein each of said flat, elongated carbon fiber electrodes is composed of a plurality of carbon fibers which define said pattern, said pattern being a biaxial braid.

17. The electrode bundle for use in a lithium ambient graphite fiber battery of claim 14, wherein each of said flat, elongated carbon fiber electrodes is composed of a plurality of carbon fibers which define said pattern, said pattern being unidirectional.

18. A pair of flat, elongated carbon fiber electrodes folded to substantially define a cubical shape for use in a lithium ambient graphite fiber battery, each of said flat, elongated carbon fiber electrodes being composed of a plurality of carbon fibers which define a pattern, said pattern being a triaxial braid.

19. A pair of flat, elongated carbon fiber electrodes folded to substantially define a cubical shape for use in a lithium ambient graphite fiber battery, each of said flat, elongated carbon fiber electrodes being composed of a plurality of carbon fibers which define a pattern, said pattern being a biaxial braid.

20. A pair of flat, elongated carbon fiber electrodes folded to substantially define a cubical shape for use in a lithium ambient graphite fiber battery, each of said flat, elongated carbon fiber electrodes being composed of a plurality of carbon fibers which define a pattern, said pattern being unidirectional.

* * * * *